United States Patent [19]
Sekine et al.

[11] Patent Number: 5,587,737
[45] Date of Patent: Dec. 24, 1996

[54] SHAKEPROOF CAMERA WHEREIN SHAKE CORRECTION PARAMETERS MAY BE CHANGED

[75] Inventors: Masayoshi Sekine, Tokyo; Toshiaki Kondo, Fujisawa; Yoshiki Kino, Tokyo, all of Japan

[73] Assignee: Canon Kabushiki Kaisha, Tokyo, Japan

[21] Appl. No.: 449,917

[22] Filed: May 25, 1995

Related U.S. Application Data

[63] Continuation of Ser. No. 6,974, Jan. 21, 1993, abandoned.

[30] Foreign Application Priority Data

Jan. 23, 1992 [JP] Japan ................................ 4-010184

[51] Int. Cl.$^6$ .................................................. H04N 5/228
[52] U.S. Cl. ............................................ 348/208; 348/296
[58] Field of Search ................................ 348/208, 221, 348/296, 207; 364/157; H04N 5/228

[56] References Cited

U.S. PATENT DOCUMENTS

| | | | |
|---|---|---|---|
| 4,349,868 | 9/1982 | Brown | 364/157 |
| 5,012,270 | 4/1991 | Sekine et al. | 354/430 |

FOREIGN PATENT DOCUMENTS

| | | | |
|---|---|---|---|
| 0332169 | 9/1989 | European Pat. Off. | H04N 5/224 |
| 0388936 | 9/1990 | European Pat. Off. | H04N 5/217 |
| 59-013474 | 1/1984 | Japan | H04N 5/26 |
| 61-269572 | 11/1986 | Japan | H04N 5/2332 |

OTHER PUBLICATIONS

K. J. Aström, B. Wittenmark, 'Adaptive Control', May 1989, Addison–Wesley, "Chapter 9, Gain Scheduling".

*Primary Examiner*—Wendy Garber
*Assistant Examiner*—Andrew B. Christensen
*Attorney, Agent, or Firm*—Fitzpatrick, Cella, Harper & Scinto

[57] ABSTRACT

A shakeproof camera includes an image pickup element whose exposure time and exposure period are set variable, a shake detection circuit for detecting a photographed image shake on the basis of an output from the image pickup element, a shake correction unit for correcting the image shake on the basis of an output from the shake detection circuit, and a control circuit for changing control parameters of the shake correction unit in accordance with the exposure time and the exposure period of the image pickup element.

22 Claims, 6 Drawing Sheets

SHAKEPROOF CAMERA WHEREIN SHAKE CORRECTION PARAMETERS MAY BE CHANGED

This application is a continuation of application Ser. No. 08/006,974 filed Jan. 21, 1993, now abandoned.

BACKGROUND OF THE INVENTION

1. Field of the Invention

The present invention relates to a shakeproof camera having a shake correction function.

2. Description of the Related Art

Video input devices such as television cameras, electronic still cameras, video cameras, and industrial image measuring devices have been very popular. Camera shake cause problems in the use of these video input devices. Camera shake causes not only degradation of a photographed image, but also an erroneous operation of a control system for automatic focus control or the like.

A camera shake correction apparatus comprises a shake detecting means for detecting a camera shake and a correcting means for correcting an image in accordance with the amount and direction of a shake detected by the shake detecting means. The shake detecting means employs a method of causing an acceleration sensor or angular velocity sensor to physically detect a shake or an electronic method of processing a photographed image signal to detect a movement vector. The shake correcting means employs a method of optically correcting the shake by means of a variable vertical angle prism or an electronic method for selecting a read range using an image memory.

Figure 1:
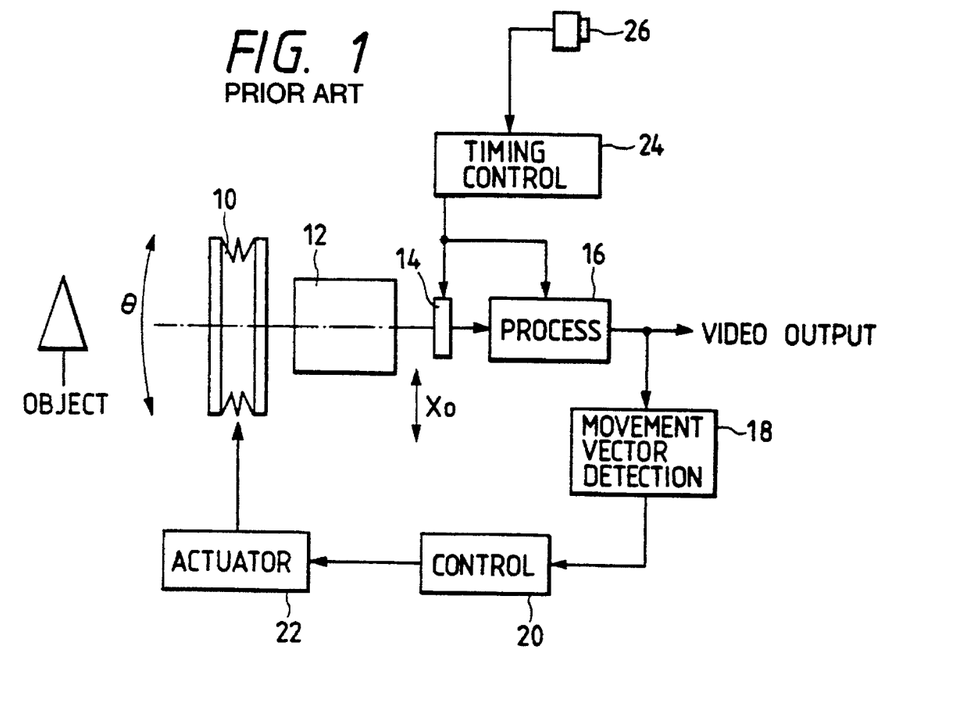
FIG. 1 is a block diagram showing a shakeproof system.

An image pickup apparatus for electronically detecting a camera shake and optically correcting the camera shake is described in Japanese Laid-Open Patent Application No. 61-269572, and the block diagram of its schematic arrangement is shown in FIG. 1.

A variable vertical angle prism 10 can change a photographic optical axis in the pitch and yaw directions. A beam from an object to be photographed is incident on a photoelectric conversion surface of a CCD image pickup element 14 through the variable vertical angle prism 10 and a zoom lens 12. The image pickup element 14 converts an optical image of the object into an electrical signal. A process circuit 16 converts an output from the image pickup element 14 into a video signal. The variable vertical angle prism is arranged such that a liquid having a high refractive index is sealed between two parallel transparent glass plates, and the relative angle between the two glass plates is set to be variable to obtain a variable vertical angle.

A movement vector detection circuit 18 compares output signals representing a current frame and a previous frame from the process circuit 16 and detects an amount of movement of the object (or the camera) and its direction, i.e., the movement vector. A control circuit 20 uses predetermined coefficients to perform convolution processing of the movement vector detected by the movement vector detection circuit 18. The control circuit 20 generates a drive signal for the variable vertical angle prism 10 and supplies it to an actuator 22. The actuator 22 drives the variable vertical angle prism 10 in accordance with the drive signal from the control circuit 20. The variable vertical angle prism 10 shifts the photographic optical axis in the pitch and yaw directions so as to compensate for or cancel the image shake caused by the camera shake.

More specifically, when the entire apparatus vibrates during photography of an object, the angle of incident light from the object changes, and a position $X_0$ of the object image on the image pickup surface changes accordingly. The movement vector detection circuit 18 outputs a difference between the object image position of the previous frame and that of the current frame. This difference signal is calculated by the control circuit 20, thereby driving the variable vertical angle prism 10.

The exposure time (accumulation time) and the period of the CCD image pickup element 14 are variable. For example, if an object which is moving at a high speed is to be photographed, a high-speed (e.g., 1/1,000 sec.) shutter mode is set to prevent blurring of the edge of the object image. If an object has a low luminance, a long exposure mode is set in which the exposure period is set longer than the field period so as to obtain a sufficiently high S/N ratio. The exposure time and the exposure period of the image pickup element 14 are controlled by control signals from a timing control circuit 24. The exposure time and the exposure period can be selected by a means such as an operation switch 26. That is, when an operation mode of the image pickup element 14 is designated with the operation switch 26, the timing control circuit 24 drives the image pickup element 14 in accordance with the above designation.

Even in a long exposure mode wherein the exposure time exceeds the field period, the process circuit 16 must output a video signal of a standard field period. For this reason, the output from the timing control circuit 24 is also supplied to the process circuit 16. In the long exposure mode, the process circuit 16 repeatedly outputs the video signal of the same frame during exposure of the image pickup element 14.

The above-described camera shake correction system is a feedback system. The response characteristics of all the elements of the feedback loop, i.e., the variable vertical angle prism 10, the zoom lens 12, the image pickup element 14, the process circuit 16, the movement vector detection circuit 18, the control circuit 20, and the actuator 22 at an object position $X_0$ within the frame determine the shakeproof characteristics of the camera. This system is a discrete time system having a frame output cycle (normally a vertical frequency of 60 Hz) of the image pickup element 14 as a sampling frequency.

The response characteristics, and particularly idle time components of the image pickup element 14, the process circuit 16, and the movement vector detection circuit 18 are taken into consideration. In the normal mode, the image pickup element 14 accumulates the charge signal of the object image focused on the light-receiving surface for a one-field period and outputs the accumulated charge signal in the next field period. The movement vector detection circuit 18 starts a detection operation in synchronism with the read operation of the charge from the image pickup element 14 (or the start of the image portion of the video signal output from the process circuit 16). The movement vector detection circuit 18 outputs a detection result in the vertical blanking period.

If the image movement caused by the camera shake has an average value at the center during the charge accumulation period of the image pickup element 14, an idle time of 1.5 field periods is caused in the section consisting of the image pickup element 14, the process circuit 16, and the movement vector detection circuit 18. Note that the delay time in the process circuit 16 is neglected. The idle time is long not to be neglected with respect to the sampling frequency. The variation in idle time greatly influences the shakeproof performance.

Figure 2:
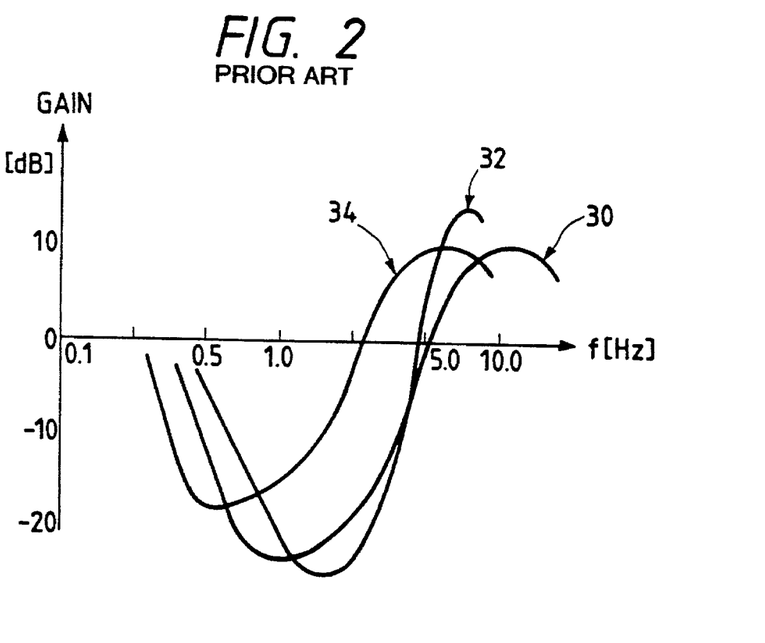
FIG. 2 is a graph showing the shakeproof characteristics of the shakeproof system shown in FIG. 1.

As described above, in the CCD image pickup element, the exposure time and the exposure period can be externally controlled. However, the characteristics of the shakeproof control system are set so that a camera shake such as a hand shake can be effectively suppressed in the normal photographic mode. FIG. 2 shows the frequency characteristics of the shakeproof characteristics. The gain is plotted along the ordinate, and the frequency is plotted along the abscissa. Since the hand shake in the camera has a strong spectral component near 1 Hz, the control circuit 20 is set to intensively suppress the component near 1 Hz, as indicated by a characteristic curve 30.

When the control circuit 20 is set under the above conditions, and the image pickup element 14 is operated in a high-speed shutter mode, the overall characteristics are shifted to the high frequency side, as indicated by a characteristic curve 32. In the long exposure mode, the overall characteristics are shifted to the low frequency side, as indicated by a characteristic curve 34. In either case, the suppression performance near 1 Hz is degraded. That is, in the shakeproof camera using the image pickup element, the shakeproof characteristics change in accordance with changes in operation modes of the image pickup element. As a result, appropriate camera shake suppression cannot be performed.

SUMMARY OF THE INVENTION

The present invention has been made to solve the conventional problems described above, and has as its first object to provide a shakeproof camera capable of always realizing maximum Shakeproof characteristics regardless of photographic states.

It is the second object of the present invention to provide a shakeproof camera capable of obtaining maximum shakeproof characteristics regardless of operating states of an image pickup means.

It is the third object of the present invention to provide a shakeproof camera capable of improving response characteristics of a shake detection system, eliminating a control delay time, and realizing a high-speed, immediate shakeproof operation.

It is the fourth object of the present invention to provide a shakeproof apparatus having appropriate shakeproof characteristics in photography with a high-speed shutter operation and long exposure.

In order to achieve the above objects, according to a preferred embodiment of the present invention, there is provided a shakeproof camera comprising image pickup means, shake detecting means for detecting an image shake on the basis of an output from the image pickup means, shake correcting means for correcting the image shake in accordance with an output from the shake detecting means, and control means for changing a control parameter of the shake correcting means in accordance with an exposure time and an exposure period of the image pickup means.

It is the fifth object of the present invention to provide a video camera capable of obtaining shake correction characteristics equal to those of a normal photographic mode even in a special photographic mode such as a high-speed shutter mode or a long exposure mode.

It is the sixth object of the present invention to provide a video camera capable of obtaining good shakeproof characteristics even when an object moving at a high speed or an object having a low luminance is to be photographed.

The above and other objects, features, and advantages of the present invention will be apparent from the following detailed description in conjunction with the accompanying drawings.

DETAILED DESCRIPTION OF THE PREFERRED EMBODIMENTS

Preferred embodiments of the present invention will be described below with reference to the accompanying drawings.

Figure 3:
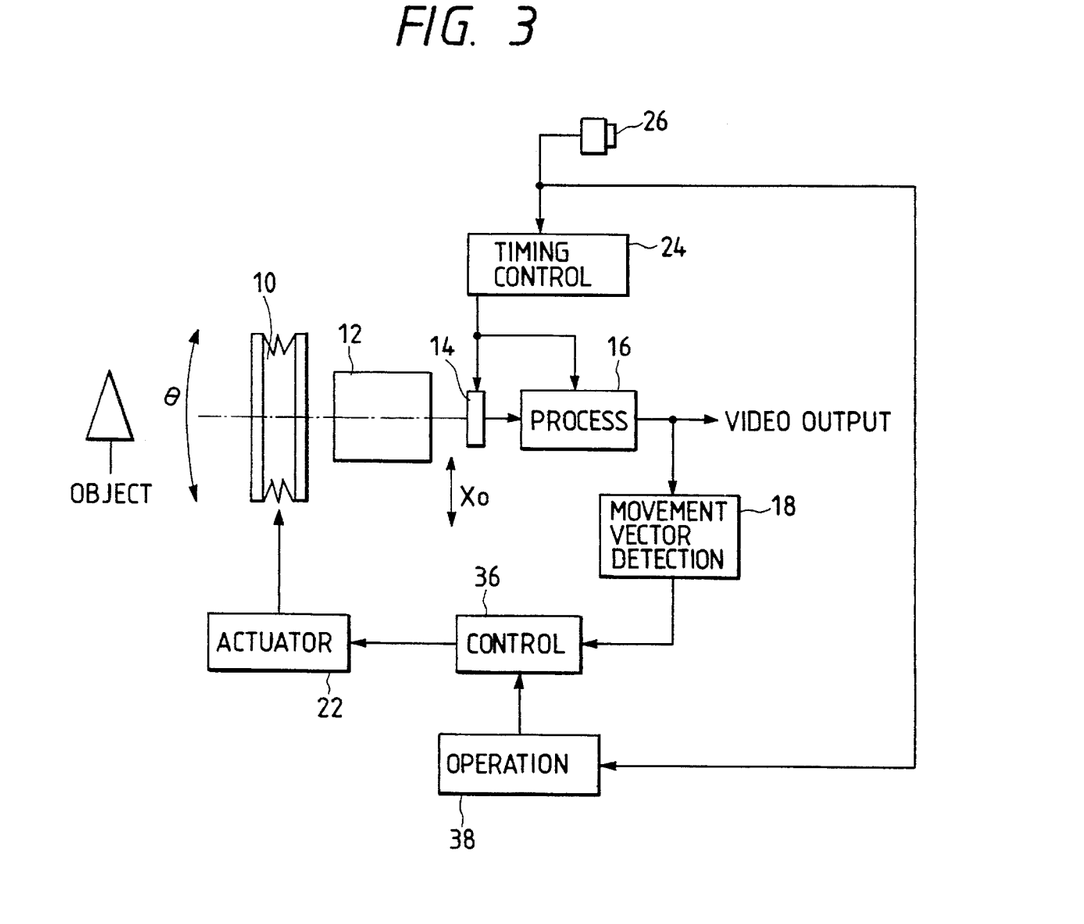
FIG. 3 is a block diagram of a shakeproof camera according to an embodiment of the present invention.

FIG. 3 is a block diagram showing the schematic arrangement of an embodiment of the present invention. The same reference numerals as in FIG. 1 denote the same parts in FIG. 3. A control circuit 36 is used in place of the control circuit 20. The control circuit 36 comprises a programmable arithmetic element such as a digital signal processor (DSP) to externally set coefficients in convolution operations. An operation circuit 38 sets the coefficients of the control circuit 36 in accordance with selection of an operation switch 26.

The control circuit 36 performs the following convolution operation.

$$y_n = \sum_{i=0}^{m} bi \cdot x_{n-1} + \sum_{j=1}^{m} aj \cdot y_{n-j}$$

where x is the movement vector (i.e., an output from a movement vector detection circuit 18), y is an output from the control circuit 36), n is the current time so that n−1, n−2, . . . indicate the immediately preceding sampling time, the second preceding sampling time, . . . , aj and bi are control parameters, i is an integer of 0 to m, and j is an integer of 1 to m.

The operation circuit 38 adjusts the control parameters aj and bi in the control circuit 36 in accordance with the operation mode of an image pickup element 14. A method of calculating the control parameters aj and bi will be described below.

Figure 4:
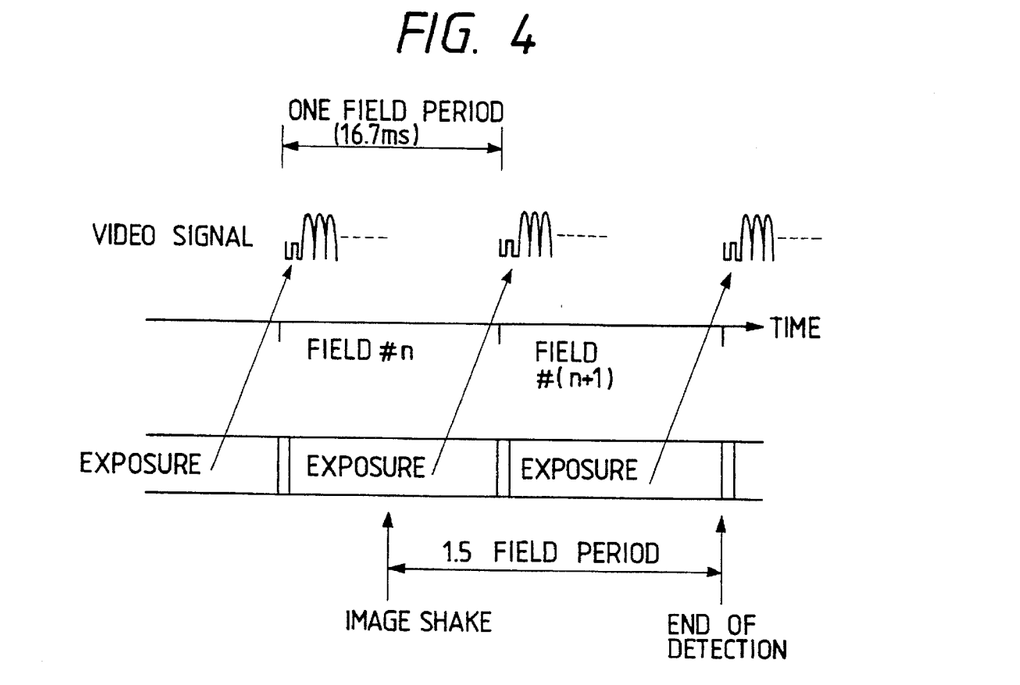
FIG. 4 is an exposure timing chart of an image pickup element in a normal mode.
Figure 5:
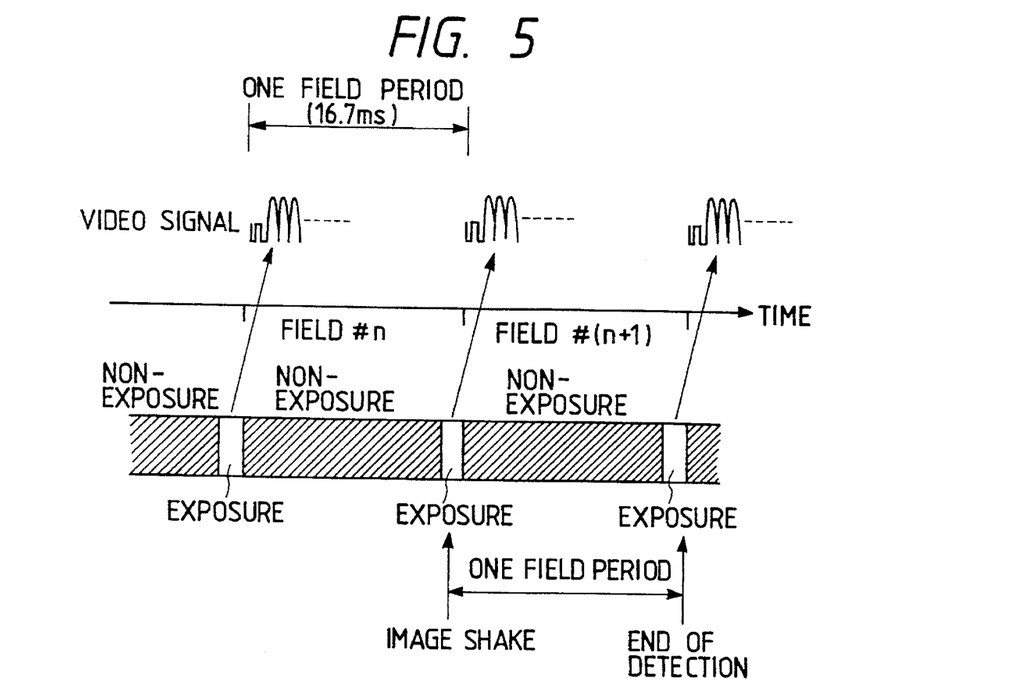
FIG. 5 is an exposure timing chart of the image pickup element in a high-speed shutter mode.
Figure 6:
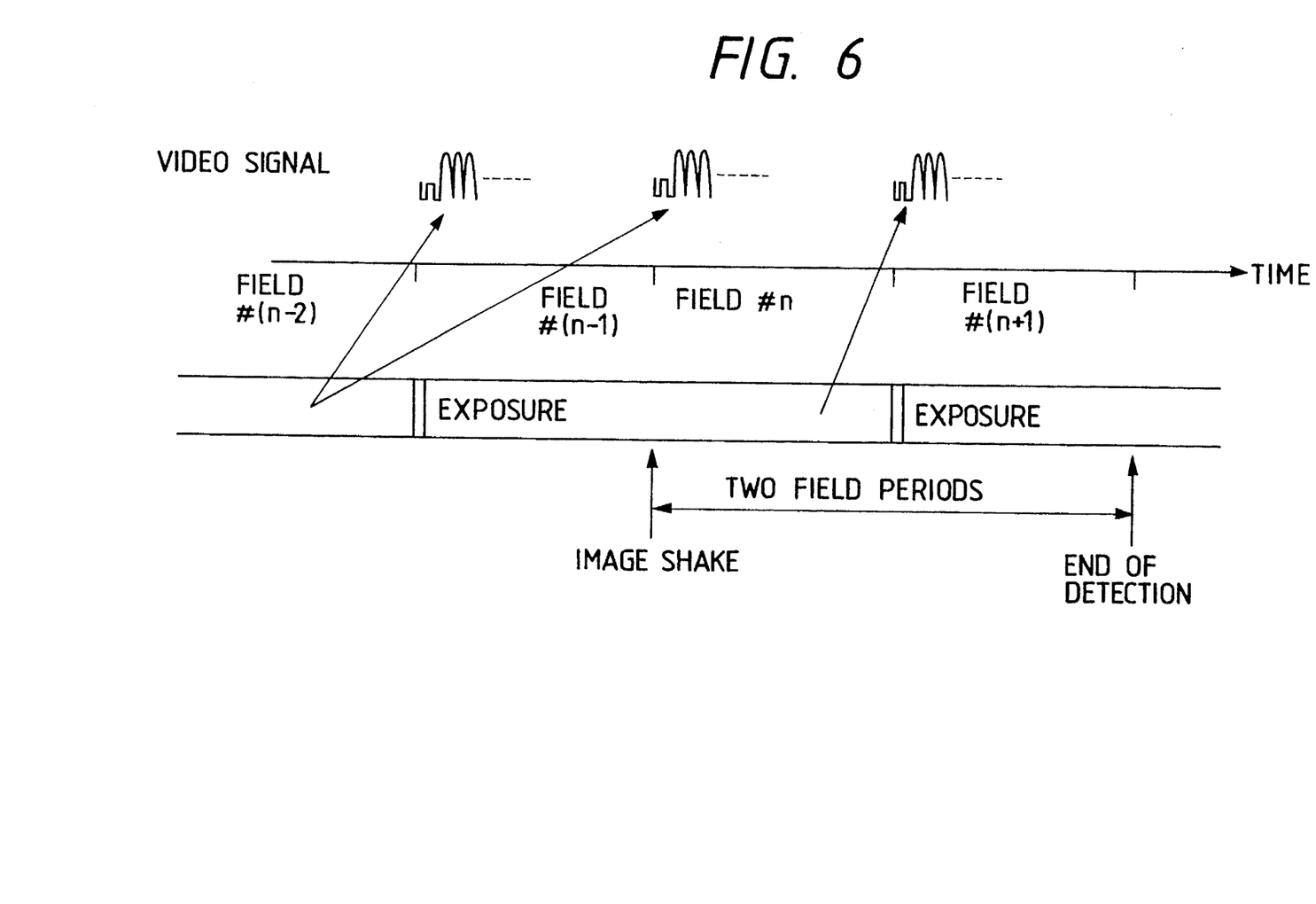
FIG. 6 is an exposure timing chart of the image pickup element in a long exposure mode.

The timings of the exposure operations of the image pickup element 14 and the detection operations of the movement vector detection circuit 18 in the normal operation mode, the high-speed shutter mode, and the long exposure mode are shown in FIGS. 4, 5, and 6, respectively.

In the normal operation mode, as shown in FIG. 4, a video signal of a field #(n+1) is a signal obtained by exposure of a field #n. As previously described, a time (i.e., an idle time within the loop) from camera shake to movement vector detection has an average value of 1.5 field periods.

In the high-speed shutter mode, as shown in FIG. 5, the exposure time is very short, and most of one field period is the non-exposure time (hatched portion). In the high-speed shutter mode, the non-exposure time is followed by the exposure time within each field period. In this case, a video signal of a field #(n+1) is generated by exposure of a field #n. A time (i.e., an idle time within the loop) from the camera shake to movement vector detection is about one field period.

In the long exposure mode, as shown in FIG. 6, the image pickup element 14 is subjected to exposure for, e.g., two fields. In this case, a video signal of a field #(n+1) is generated by two-field exposure of a field #(n−1) and a field #n. The image pickup element 14 outputs an image signal once within the two field periods. That is, the sampling frequency of the system becomes ½ (30 Hz). The delay (i.e., the idle time) of the image pickup element and the movement vector detection circuit becomes two field periods. A process circuit 16 outputs the same video signal as that of the field #(n−1) in the field #n. The movement vector detection circuit 18 outputs a movement vector between the frames every other field.

Figure 7:
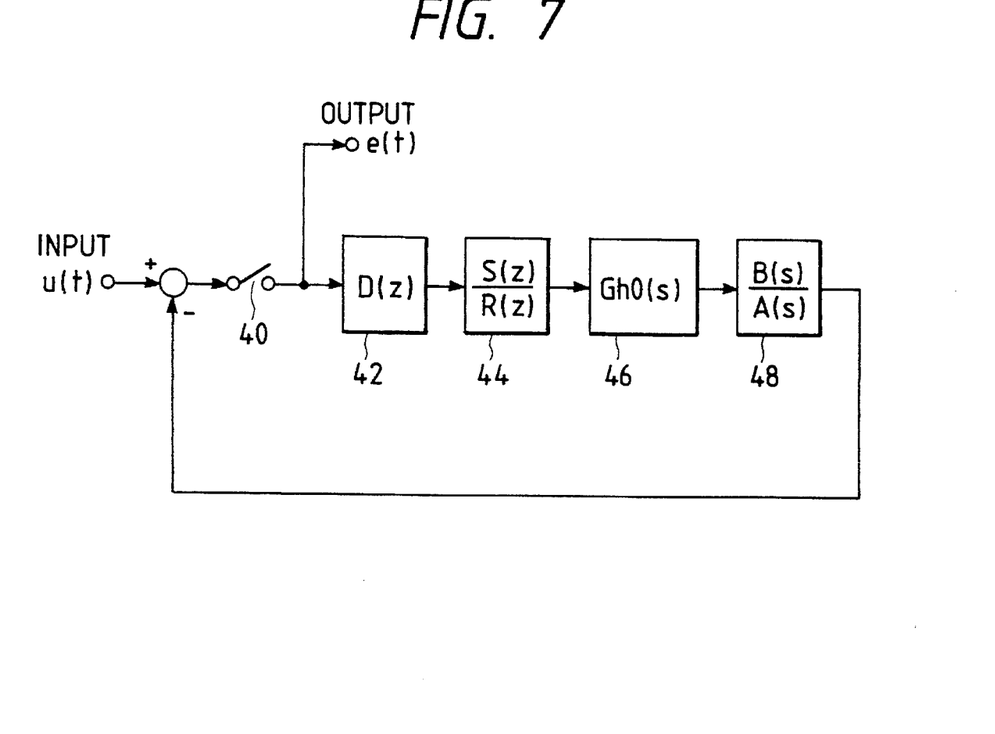
FIG. 7 is a circuit diagram showing an equivalent circuit of a shakeproof control system shown in FIG. 3.

The following method is effective as a method of determining control parameters for a system which has time elements varying within a loop and a specific frequency component to be suppressed. FIG. 7 shows an equivalent circuit in which the control loop in FIG. 3 is represented by a transfer function. A sampler 40 represents image sampling at the image pickup element 14. The image pickup element 14, the process circuit 16, and the movement vector detection circuit 18 have response characteristics 42. The response characteristics 42 include a delay time. The control circuit 36 has response characteristics 44. A 0th-order hold circuit 46 connects a discrete time system to a continuous time system. An actuator 22 and a variable vertical angle prism 10 have response characteristics 48.

R(z) of the response characteristics 44, S(z)/R(z), of the control circuit 36 is divided into two components as follows:

$$R(z) = R1(z) \cdot R2(z)$$

If the sampler 40, the hold circuit 46, and the block 48 are represented by a single function as follows:

$$B'(z)/A'(z) = D(z) \cdot Z\{Gh0(^s) \cdot B(s)/A(s)\}$$

the transfer function of the shakeproof control system as a whole is represented as follows:

$$G(z) = E(z)/U(z)$$

for $$E(z) = R1(z) \cdot R2(z) \cdot A'(z)$$

$$U(z) = R1(z) \cdot R2(z) \cdot A'(z) + S(z) \cdot B'(z)$$

The poles of the system, i.e., the root of the denominator of G(z) is determined so as to satisfy the stabilizing conditions of the system. The characteristic functions S(z) and R(z) of the control circuit 36 are counted back. For example, it is assumed that R1(z) is given by:

$$\begin{aligned} R1(z) &= 1 - 2r\cos(\omega cT)/z + (r/z)(r/z) \\ &= 1 - 2r\cos(\omega cT) \cdot z^{-1} + r^2 \cdot z^{-2} \end{aligned}$$

where r is a coefficient of less than 1, ωc is the center frequency, and T is the sampling period. If the center frequency ωc is set equal to the hand shake frequency, the shakeproof characteristics at this frequency can be improved.

The operation circuit 38 performs the above operation in each operation mode of the image pickup element 14 and at each hank shake frequency to obtain the parameters of the control circuit 36. The resultant control parameters are supplied to the control circuit 36.

Figure 8:
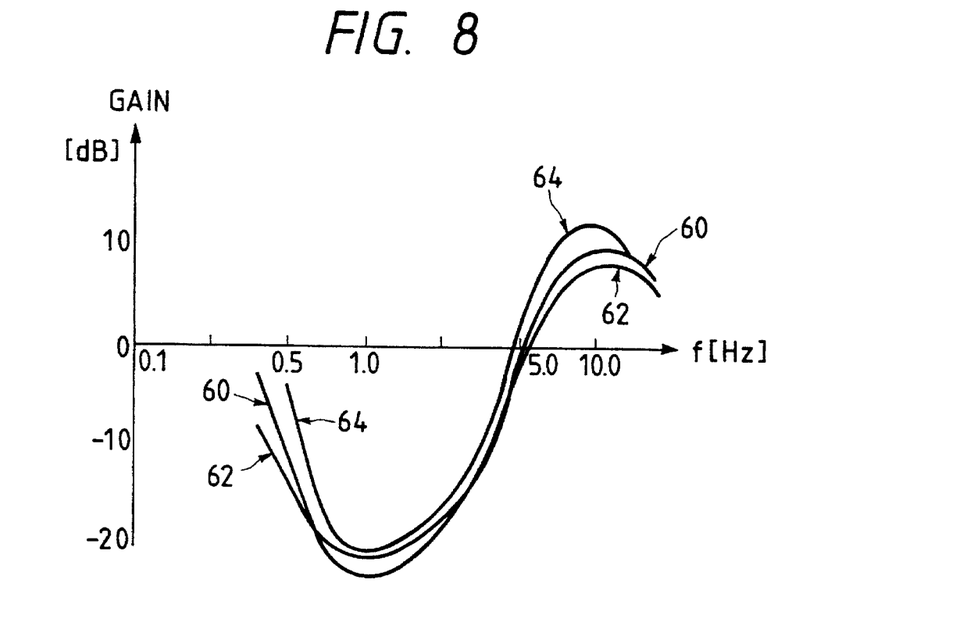
FIG. 8 is a graph showing the shakeproof characteristics of the embodiment shown in FIG. 3.

As described above, according to the present invention, appropriate shakeproof control can be realized in all the modes, i.e., the normal mode, the high-speed shutter mode, and the long exposure mode. FIG. 8 shows the frequency characteristics of the resultant shakeproof characteristics. The gain is plotted along the ordinate, and the frequency is plotted along the abscissa. A characteristic curve 60 represents the frequency characteristics in the normal mode. A characteristic curve 62 represents the frequency characteristics in the high-speed shutter mode. A characteristic curve 64 represents the frequency characteristics in the long exposure mode. The characteristics represented by all the characteristic curves 60 to 64 are almost identical to each other, thereby properly suppressing the hand shake frequency. Note that the hand shake frequencies are concentrated at 1 Hz in FIG. 8. When the hand shake frequencies are concentrated at another frequency, the center frequency ωc is set equal to that frequency, and corresponding control parameters are determined.

Figure 9:
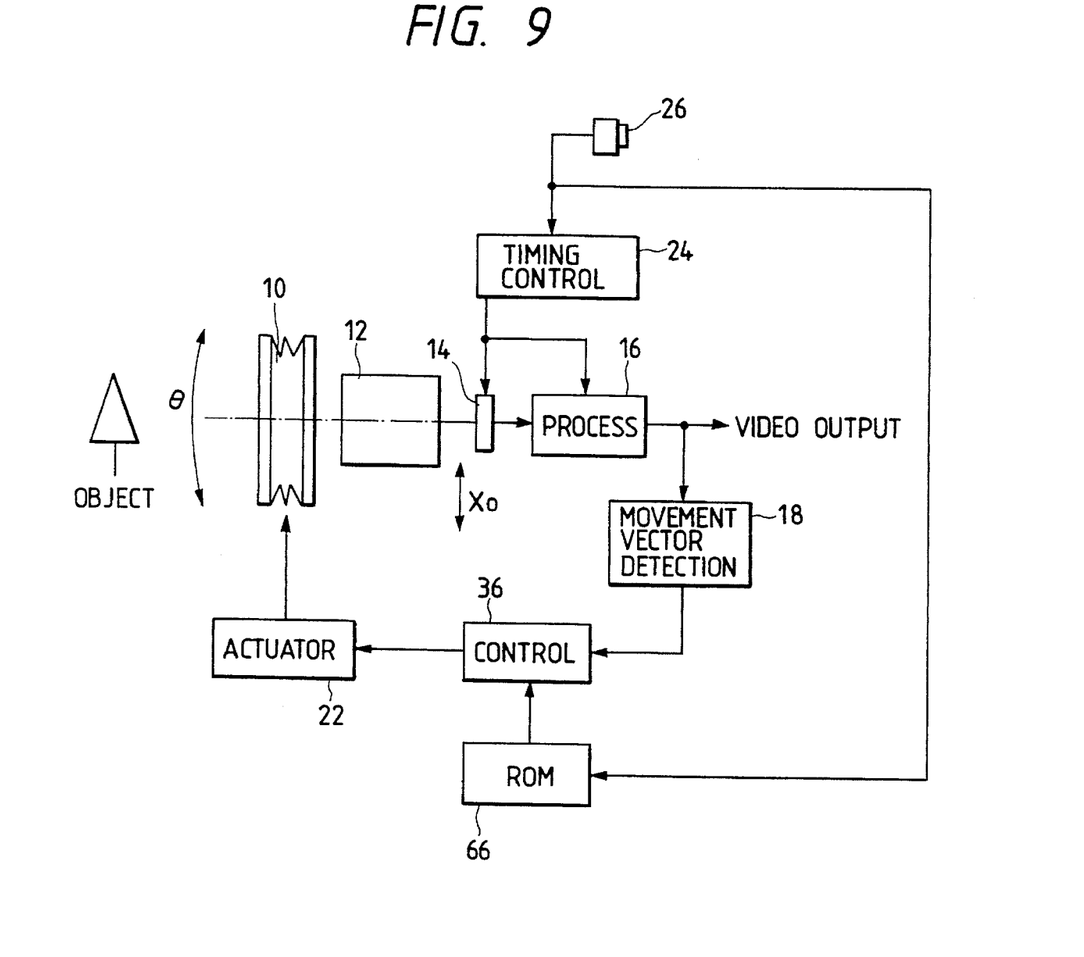
FIG. 9 is a block diagram showing another embodiment of the present invention.

In the embodiment shown in FIG. 3, the operation circuit 38 determines the control parameters of the control circuit 36 in accordance with the operation mode of the image pickup element 14. However, control parameters corresponding to all the operation modes may be calculated by the operation circuit 38 in advance and may be stored in a ROM or the like. The corresponding control parameters may be read out from the ROM in accordance with selection (an output from a switch 26) of the operation mode of the image pickup element 14, and the readout control parameters may be supplied to the control circuit 36. FIG. 9 is a block diagram of another embodiment for the above arrangement. Control parameters of a control circuit 36 are stored in a ROM 66 in correspondence with the respective operation modes of an image pickup element 14. Appropriate control parameters are output from the ROM 66 to the control circuit 36 in accordance with the selection of the switch 26.

In the arrangement of FIG. 9, only the parameters within a limited range can be generated. However, since no operation is performed to determine parameters, a high-speed, low-cost arrangement is obtained.

The above embodiment exemplifies an optical shake correction unit using the variable vertical angle prism 10. However, the present invention is not limited to the arrangement of the shake correction unit itself. That is, the present invention is also applicable to a shakeproof camera using a shake correction unit for performing image processing such that a photographed image is temporarily stored in an image memory and the image data is read out in a range corresponding to a shake vector.

As can be readily understood from the above description, in the above-described arrangement, appropriate shakeproof characteristics can be always obtained regardless of the exposure time and the exposure period of the image pickup means.

What is claimed is:

1. A shakeproof camera comprising:
   (A) image pickup means;
   (B) shake detecting means for detecting an image shake from an image pickup signal output from said image pickup means;
   (C) shake correcting means for correcting the image shake in accordance with an output from said shake detecting means;
   (D) control structure for changing an accumulation time of said image pickup means; and
   (E) control means for changing correction parameters of said shake correcting means in accordance with a variation of the accumulation time of said image pickup means controlled by said control structure.

2. A camera according to claim 1, wherein said shake detecting means calculates a movement vector of the image on the basis of a change of the image between a plurality of frames, and detects a shake amount and a shake direction.

3. A camera according to claim 1, wherein said shake correcting means includes a variable vertical angle prism.

4. A camera according to claim 1, wherein said shake correcting means comprises a shake correction feedback loop control system including said image pickup means, said shake detecting means, and said shake correcting means, and wherein said shake correction feedback loop control system comprises a discrete time control system having the accumulation time of the image pickup signal of said image pickup element as a sampling frequency.

5. A camera according to claim 4, wherein said shake detecting means starts a detection operation in synchronism with read access of said image pickup means and outputs a detection result during a vertical blanking period.

6. A camera according to claim 4, wherein the sampling frequency of said shake detecting means is substantially equal to the accumulation time of said image pickup means, and wherein said control means changes correction parameters of said feedback loop control system in accordance with the sampling frequency.

7. A camera according to claim 1, further comprising mode operating means for changing an accumulation time and/or an exposure period of said image pickup means in accordance with a photographic mode, and wherein said control means changes the correction parameters in accordance with a photographic mode set by said mode operating means.

8. A shakeproof camera comprising:
   (A) image pickup means;
   (B) movement vector detecting means for detecting a movement vector of an image at a predetermined sampling period from an image pickup signal output from said image pickup means;
   (C) control structure for controlling the sampling period so as to produce sampling periods which are equal to, greater than, and less than a standard image pickup period of the image sensor;
   (D) correcting means for correcting a movement of the image in accordance with an output from said movement vector detecting means; and
   (E) control means for changing correction parameters of said correcting means in accordance with a change in the sampling period controlled by said control structure.

9. A camera according to claim 8, wherein said correcting means includes a variable vertical angle prism.

10. A camera according to claim 8, wherein the sampling period of said movement vector detecting means is substantially equal to a read period of said image pickup means.

11. A camera according to claim 10, wherein said movement vector detecting means samples at the read period of said image pickup means and outputs detection information during a vertical blanking period.

12. A camera according to claim 11, wherein said correction means changes the control parameters to correct a delay of a feedback loop comprising by said image pickup means, said movement vector detecting means, and said correcting means.

13. A camera according to claim 12, wherein said control means varies a coefficient of a transfer function of said feedback loop variable.

14. A shakeproof camera comprising:
   (A) image pickup means;
   (B) exposure control means for changing an exposure time of said image pickup means;
   (C) shake detecting means for detecting an image shake in accordance with a read period of said image pickup means from an image pickup signal output from said image pickup means;
   (D) shake correcting means for correcting the image shake in accordance with an output from said shake detecting means; and
   (E) control means for changing correction parameters of said shake correcting means in accordance with a variation of the exposure time of said image pickup means which is set by said exposure control means.

15. A camera according to claim 1, wherein said shake detecting means calculates a movement vector of an image on the basis of a change between a plurality of frames obtained at different times and detects a shake amount and a shake direction.

16. A camera according to claim 15, wherein said shake correcting means includes a variable vertical angle prism and comprises, together with said image pickup means and said shake detecting means, a shake correction feedback loop control system for driving and controlling said variable vertical angle prism, and wherein said shake correction feedback loop control system comprises a discrete time control system having a read cycle of the image pickup signal of said image pickup means as a sampling frequency.

17. A camera according to claim 14, wherein said shake detecting means starts a detection operation in synchronism with read access of said image pickup means and outputs a detection result during a vertical blanking period.

18. A camera according to claim 14, wherein said exposure control means changes an accumulation time and/or the read period of said image pickup means in accordance with a photographic mode and changes correction parameters of said shake correcting means in accordance with a change in the accumulation time and/or the read period.

19. A shakeproof camera comprising:
   (A) image pickup means;
   (B) shake detecting means for detecting an image shake from an image pickup signal output from said image pickup means;
   (C) shake correcting means for correcting the image shake in accordance with an output from said shake detecting means;
   (D) storage means for storing correction characteristics of said shake correcting means in correspondence with a plurality of image pickup modes of said image pickup means, wherein the image pickup modes comprise a standard image pickup mode, a high-speed shutter image pickup mode, and a long exposure mode; and (E) control means for, in response to a change of said image pickup mode, reading out correction characteristics corresponding to the image pickup mode of said image pickup means from said storage means and setting the readout correction characteristics in said shake correcting means.

20. A camera according to claim 19, further comprising mode selecting means for selecting the image pickup mode, and wherein said control means controls the correction characteristics in accordance with a state of said mode selecting means.

21. A camera according to claim 19, wherein said shake correcting means comprises a shake correction feedback control system including said image pickup means, said shake detecting means, and said shake correcting means, and wherein said shake correction feedback control system comprises a discrete time control system having a read cycle of the image pickup signal of said image pickup means as a sampling frequency.

22. A camera according to claim 21, further comprising read period control means for controlling a read period of said image pickup means, and wherein the sampling frequency of said shake detecting means is substantially equal to a read period of said image pickup means, and said control means changes the correction characteristics of said feedback loop control system in accordance with a change in the sampling frequency.

* * * * *

UNITED STATES PATENT AND TRADEMARK OFFICE
CERTIFICATE OF CORRECTION

PATENT NO. : 5,587,737
DATED : December 24, 1996
INVENTOR(S) : MASAYOSHI SEKINE, ET AL.

It is certified that error appears in the above-identified patent and that said Letters Patent is hereby corrected as shown below:

COLUMN 3:

Line 35, "Shakeproof" should read --shakeproof--.

COLUMN 4:

Line 53, "36)," should read --36,--.

COLUMN 8:

Line 10, "by" should be deleted.

Signed and Sealed this

Fourteenth Day of October, 1997

Attest:

BRUCE LEHMAN

Attesting Officer     Commissioner of Patents and Trademarks